United States Patent [19]
Zalis

[11] Patent Number: 5,876,665
[45] Date of Patent: Mar. 2, 1999

[54] METHOD AND APPARATUS FOR DISTRIBUTING INSECT REPELLANT

[76] Inventor: George A. Zalis, 2021 West Clarendon, Phoenix, Ariz. 85015

[21] Appl. No.: 942,661

[22] Filed: Oct. 2, 1997

[51] Int. Cl.[6] ....................................................... A61L 2/18
[52] U.S. Cl. ............................... 422/28; 422/4; 422/123; 422/306; 424/405; 43/132.1; 43/900
[58] Field of Search .............................. 422/4, 120, 123, 422/255–257, 28, 32, 33, 292, 300, 306; 424/405; 43/125, 132.1, 141, 900

[56] References Cited

U.S. PATENT DOCUMENTS

| | | | |
|---|---|---|---|
| 1,127,508 | 2/1915 | Pinckney | 43/900 |
| 2,733,957 | 2/1956 | Van Buren | 422/4 |
| 4,925,097 | 5/1990 | Corrigan | 239/73 |
| 5,095,647 | 3/1992 | Zobele et al. | 43/129 |
| 5,375,769 | 12/1994 | Schultz | 239/310 |
| 5,394,642 | 3/1995 | Takaoka | 43/900 |
| 5,595,345 | 1/1997 | Chua et al. | 239/312 |
| 5,645,845 | 7/1997 | Neumann et al. | 424/405 |

*Primary Examiner*—Krisanne Thornton
*Assistant Examiner*—Fariborz Moazzam
*Attorney, Agent, or Firm*—Quarles & Brady

[57] ABSTRACT

An insect repellant method and apparatus that can protect a defined area from insects for a determinable time period. The invention may be practiced in conjunction with or independent of normal building systems. The invention creates an invisible veil of protection against insects.

20 Claims, 3 Drawing Sheets

METHOD AND APPARATUS FOR DISTRIBUTING INSECT REPELLANT

TECHNICAL FIELD

The field of invention is methods and apparatus for dispersing insect repellant.

DESCRIPTION OF THE BACKGROUND ART

Repellants are chemical substances, natural and synthesized, having a chemical effect on insects. Their use in human and veterinary hygiene is of great practical importance, where they protect man and beast against blood sucking, biting or otherwise annoying insects. Numerous methods and apparatuses for repelling bugs away from areas occupied by humans and animals are known and marketed throughout the United States and the world.

Known apparatuses and methods employ various means to disperse insect repellant to discourage insects from occupying certain space. One such previous device uses a heat source as described in U.S. Pat. No. 5,095,647 to disperse repellent through evaporation. Another device described in U.S. Pat. No. 5,589,181 incorporates direct application of repellent on the subject desiring relief from bothersome insects. An alternative technique, as described in U.S. Pat. No. 4,823,505, involves fogging an area with repellant to evict insects from their current location.

A drawback with the previous approaches is the indiscriminate coverage area protected by evaporation and fogging. Another disadvantage is a requirement to periodically reapply repellant to provide continuous protection.

SUMMARY OF THE INVENTION

The aim of the present invention is to provide a method and apparatus that creates a veil of protection against insects.

It is also an object of this invention to provide protection from insects for a sustainable and definite time period without periodic reapplication of the repellant.

A further object of this invention is to avoid purposeful direct application of the insect repellant to the subject's skin or clothing.

According to one embodiment, insect repellent is drawn out of a vessel through a fitting and dispersed along a predefined boundary by a nozzle assembly comprising a distribution header and misting nozzles. In a version of this embodiment, the fitting is a venturi-like device. Pressurized fluid flows through the venturi-like device intermixing with the insect repellant prior to dispersement into the air. In one version of this embodiment, the fluid is pressurized water from a municipal source or private well.

In another embodiment, insect repellant is premixed with a dispersing agent such as water in a vessel. The vessel is then pressurized or the fluid is pumped out of the vessel to force the fluid through a nozzle assembly.

This invention is particularly suitable for an outdoor covered area, for example, a covered porch or tent, in which it is necessary to adopt adequate protection against insects for extended periods of time.

DETAILED DESCRIPTION OF THE PREFERRED EMBODIMENTS

Figure 1:
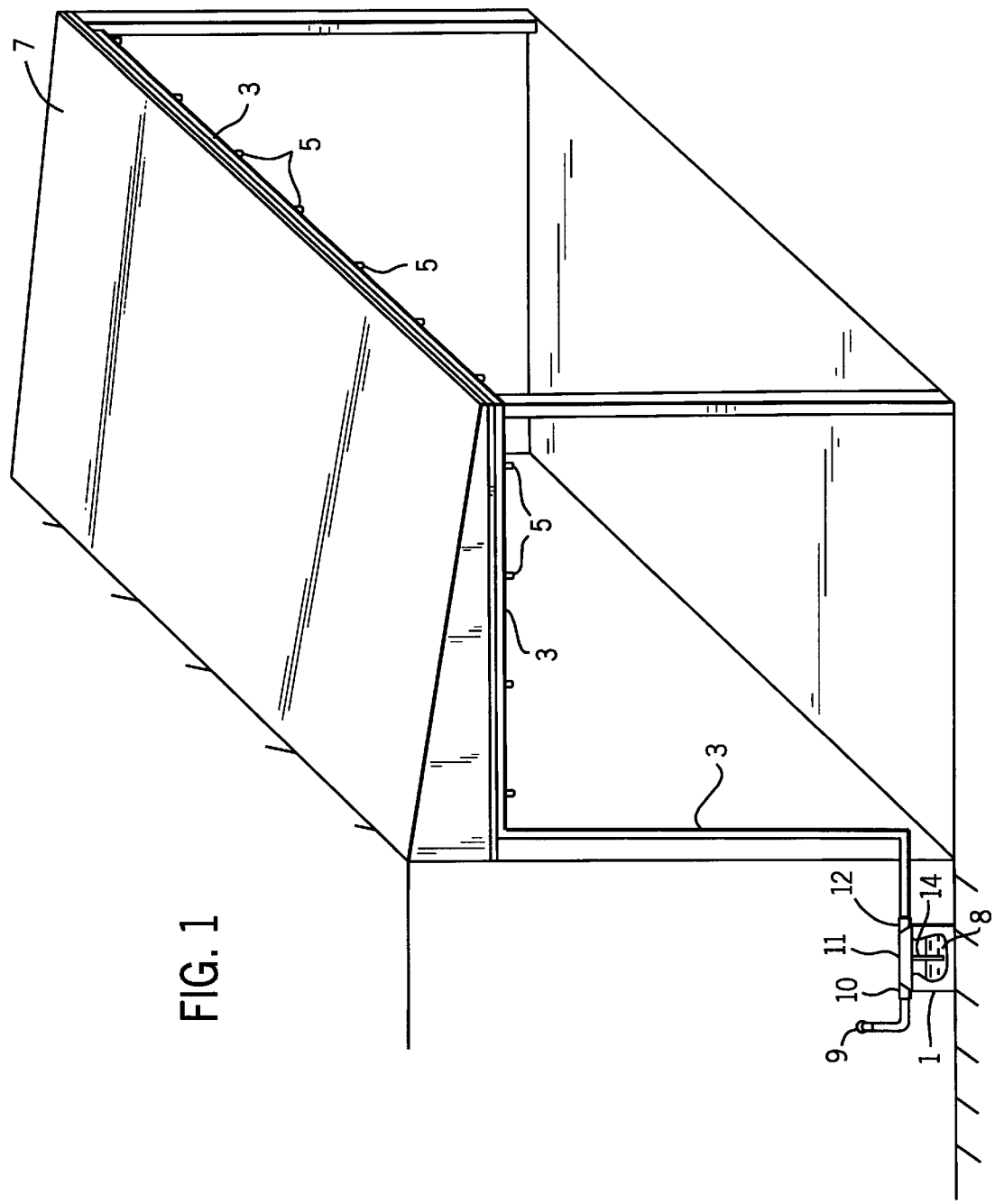
FIG. 1 shows the present insect repellant distribution system installed on an open porch with an overhead covering.
Figure 2:
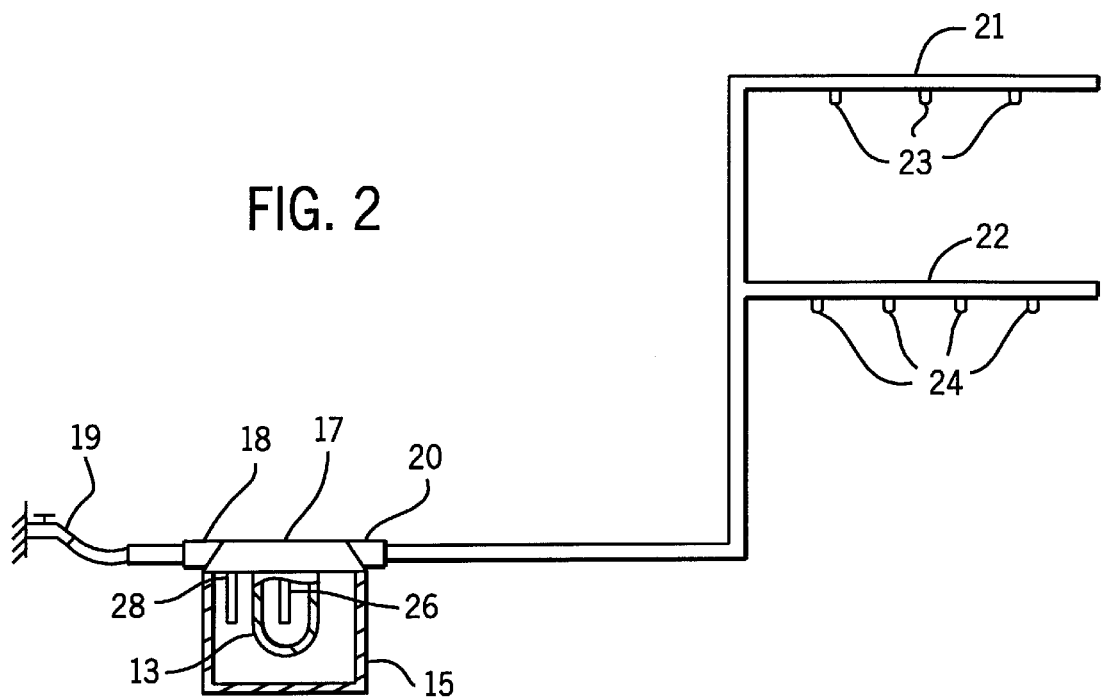
FIG. 2 shows a schematic diagram of an embodiment connected to an outside water source.

In a first embodiment, shown in FIG. 1, an insect repellent, that is nontoxic to humans, for example citronella, is placed in a vessel 1. A pressurized fluid source 9, for example a water faucet connected to a well, storage tank, or municipal water supply at standard domestic water pressure (20–100 psi), is connected to a fitting 11 which is attached to the vessel 1. Larger systems may employ a pressure pump from 100–1000 psi to increase the dispersement of insect repellant.

The fitting 11 can be a venturi-like mixing device that passes the pressurized fluid through the fitting 11 from a first inlet 10 to an outlet 12, drawing the insect repellent 8 out of the vessel 1 through inlet 14. The insect repellent mixes with the pressurized fluid as it is drawn out of the vessel 1. Fittings using a venturi for mixing and proportioning two fluids are commercially available and well known in the art, two such devices are described in U.S. Pat. Nos. 4,887,640 and 5,443,094. The fitting 11 mixes the pressurized fluid with the insect repellent and forces the insect repellent into the distribution header 3.

The distribution header 3 can be fabricated from plastic tubing, metal piping, or the like. The distribution header 3 distributes the insect repellant to a plurality of misting nozzles 5. The misting nozzles 5 disperse the insect repellant into the atmosphere along a predetermined boundary such as defined by the edge of a porch roof 7.

This embodiment and others described herein would also work with multiple distribution headers that branch off of a primary distribution header 3 or originate from multiple outlets of the fitting 11. In addition, this embodiment and others described herein would work well with any overhead covering, such as a tent or canvass awning.

The embodiments described herein are especially useful for providing extended protection against insects. For example, fitting 11 mixes the insect repellant at a ratio of 50 parts by volume of pressurized fluid to 1 part by volume of insect repellant. At a flow rate of ½ gallon of pressurized fluid per minute, one gallon of insect repellant will provide continuous protection against insects for an hour and 42 minutes before replenishment of insect repellant is required. By changing flow rates, vessel capacities, or mixing proportions and insect repellant concentrations, the time period for protection from insects can by lengthened or shortened.

In another embodiment, shown in FIG. 2, vessel 13 is a collapsible bladder contained within a second vessel 15 which is detachable from fitting 17. A pressurized fluid source 19 is connected to a fitting 17 which is attached to vessel 13 and vessel 15 such that, as the pressurized fluid passes through fitting 17 from a first inlet 18 to a first outlet 20, insect repellant is drawn out of vessel 13 through a second inlet 26. Vessel 13 collapses as insect repellant is drawn out. As vessel 13 collapses, fitting 17 allows an amount of pressurized fluid from first inlet 18 through a second outlet 28 into vessel 15. The amount of diverted pressurized fluid is equal to the amount of insect repellant exiting vessel 13, thereby maintaining a constant pressure in vessels 13 and 15. This embodiment provides consistent proportioning and mixing of the two fluids. Fitting 17 as described herein and variations thereof are commercially available and well known in the art.

The insect repellant mixture exits the fitting 17 through outlet 20 into the distribution headers 21 and 22. The mixture travels through the distribution headers 21 and 22 and is expelled out of the misting nozzles 23 and 24. The expulsion of insect repellant through the misting nozzles 23 and 24 disperses the repellent along a boundary defined by the location of the misting nozzles 23 and 24 creating an invisible veil of protection against insects.

Figure 3:
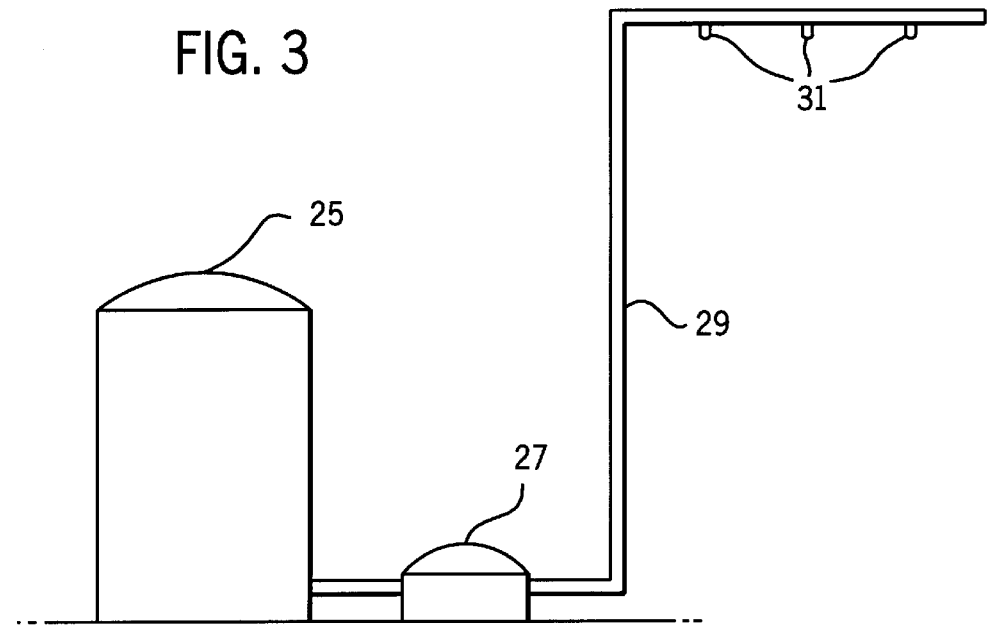
FIG. 3 shows a schematic diagram of an embodiment using a vessel containing insect repellant premixed with a dispersing fluid. The mixture is pumped out of the vessel through the nozzle assembly.

In another embodiment, shown in FIG. 3, insect repellant is premixed with a dispersing fluid, such as water, and placed in a vessel 25. A pump 27 pumps the premixed solution out of the vessel 25 and into the distribution header 29 and out of the misting nozzles 31. This allows replenishment of the vessel 25 without shutting the system down to add more repellant and dispersing fluid. This embodiment is also useful when an independent source of pressurized fluid is not readily available.

Figure 4:
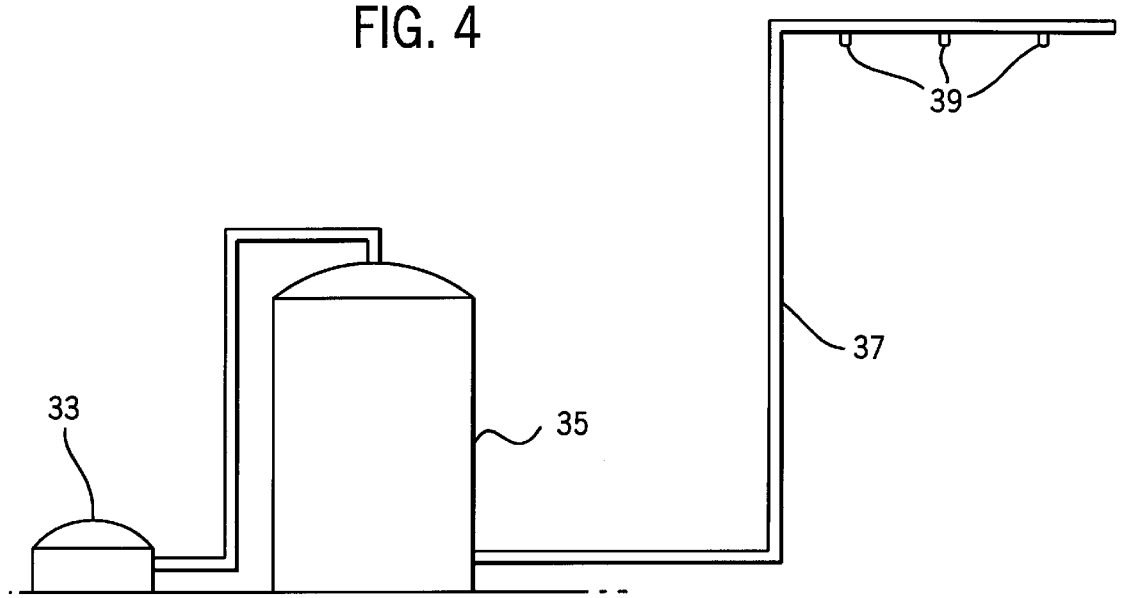
FIG. 4 shows a schematic diagram of an embodiment using a vessel containing insect repellant premixed with a dispersing fluid. The mixture is forced out of the vessel and through the nozzle assembly by compressed air introduced to the vessel.

In another embodiment, shown in FIG. 4, a source of compressed air 33, such as a compressor or pressurized air tank, forces air into the vessel 35 thereby forcing the premixed solution into a distribution header 37 and out of the misting nozzles 39. Another version of this embodiment is to pressurize vessel 35 and then disconnect the source of compressed air 33 for transportation of the pressurized vessel 35 to a remote nozzle assembly.

An aromatic compound pleasing to the sensory faculties of the subjects desiring protection from insects, may be added to the fluid insect repellant in and of the preceding embodiments. The aromatic compound can mask unpleasant odors caused by the insect repellant or other sources.

While there has been shown and described what are at present considered the preferred embodiment of the invention, it will be obvious to those skilled in the art that various changes and modifications can be made therein without departing from the scope of the invention defined by the appended claims. For example, the misting nozzles could be holes in the distribution header and the pressurized fluid could be compressed air or a volatile liquid.

I claim:

1. An insect repellant distribution system comprising:

a nozzle assembly for emitting a fluid veil into air along a boundary for discouraging insects from crossing said boundary, said nozzle assembly being spaced to define said boundary for enclosing a covered area;

a vessel connected to said nozzle assembly containing a fluid insect repellant; and a mechanism coupled to said vessel to force the fluid insect repellant from said vessel through said nozzle assembly for producing said veil in the air along said boundary.

2. An insect repellant distribution system of claim 1, wherein said nozzle assembly comprises:

a distribution header coupled to said vessel to receive the fluid insect repellant; and a plurality of misting nozzles connected to said distribution header for dispersing the fluid insect repellent from said distribution header.

3. An insect repellant distribution system of claim 2 further comprising a plurality of distribution headers, each of said distribution headers having a plurality of nozzles.

4. An insect repellant distribution system of claim 1 wherein said mechanism comprises a pump.

5. An insect repellant distribution system of claim 1 wherein said mechanism for forcing said fluid insect repellant comprises:

a coupling for attachment to a source of pressurized fluid;

a fitting having a first inlet connected to said coupling, a second inlet connected to said vessel, and an outlet connected to said nozzle assembly, wherein a flow of said pressurized fluid from said first inlet to said outlet draws the fluid insect repellant from said vessel.

6. An insect repellant distribution system of claim 5 comprising a vessel having a flexible bladder connected to said nozzle assembly.

7. An insect repellant distribution system of claim 5 wherein said pressurized fluid is water.

8. An insect repellant distribution system of claim 1 wherein said insect repellant is citronella.

9. An insect repellant distribution system of claim 1 wherein said vessel further contains an aromatic compound.

10. An insect repellant distribution system of claim 5 further comprising:

an internal flexible bladder inside of said vessel connected to said second inlet of said fitting, said flexible bladder for containing the fluid insect repellant; and a second outlet of said fitting, wherein a flow of said pressurized fluid from said first inlet to said second outlet surrounds said flexible bladder in said vessel.

11. An insect repellant distribution system as in claim 1, wherein said nozzle assembly defines a boundary about a perimeter of said covered area.

12. A method for distributing insect repellant comprising the steps:

defining a boundary for enclosing a covered area in which insects are not desired;

placing a nozzle assembly along said boundary for emitting a mist into the air;

placing an insect repellant fluid into a vessel; and forcing said insect repellant from said vessel through said nozzle assembly for producing a fluid veil in the air along said boundary for discouraging insects from crossing said boundary.

13. A method as in claim 12, wherein said forcing said insect repellant from said vessel through said nozzle assembly comprises pumping said insect repellant from said vessel into said nozzle assembly.

14. A method as in claim 12, wherein said forcing said insect repellant from said vessel through said nozzle assembly comprises pressurizing said vessel.

15. A method as in claim 12, whereas said insect repellant is citronella.

16. A method as in claim 12, further comprising placing an aromatic compound in said vessel.

17. A method as in claim 12, wherein said forcing said insect repellant from said vessel through said nozzle assembly comprises:

connecting a first inlet of a fitting to a source of pressurized fluid;

connecting a second inlet of said fitting to said vessel; and attaching an outlet of said fitting to said nozzle assembly, so that a flow of said pressurized fluid from said first inlet to said outlet draws said fluid insect repellant from said vessel through said second inlet.

18. A method as in claim 17, wherein said fitting has a venturi.

19. A method as in claim 12, wherein said forcing said insect repellant from said vessel through said nozzle assembly further comprises introducing pressurized water into said first inlet.

20. A method for distributing insect repellant underneath a structure having a covered area comprising the steps:

placing a nozzle assembly along a boundary defining an area no greater than a perimeter of said covered area; and forcing a fluid insect repellant solution from a vessel through said nozzle assembly for producing a fluid veil in the air along said boundary for discouraging insects from crossing said boundary.

* * * * *

UNITED STATES PATENT AND TRADEMARK OFFICE
CERTIFICATE OF CORRECTION

PATENT NO. : 5,876,665
DATED : March 2, 1999
INVENTOR(S) : Zalis

It is certified that error appears in the above-indentified patent and that said Letters Patent is hereby corrected as shown below:

Column 3, line 34, "and" should be --any--.

Signed and Sealed this

Fifth Day of October, 1999

Attest:

Q. TODD DICKINSON

Attesting Officer

Acting Commissioner of Patents and Trademarks